United States Patent
Penaranda Cebrian et al.

(10) Patent No.: US 12,513,089 B2
(45) Date of Patent: Dec. 30, 2025

(54) CONGESTION CONTROL

(71) Applicant: Intel Corporation, Santa Clara, CA (US)

(72) Inventors: Roberto Penaranda Cebrian, Santa Clara, CA (US); Robert Southworth, Chatsworth, CA (US); Pedro Yebenes Segura, San Jose, CA (US); Rong Pan, Saratoga, CA (US); Allister Alemania, North Plains, OR (US); Nayan Amrutlal Suthar, Pune (IN); Malek Musleh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 17/545,962

(22) Filed: Dec. 8, 2021

(65) Prior Publication Data

US 2022/0103484 A1     Mar. 31, 2022

(51) Int. Cl.
*H04L 47/25*     (2022.01)
*H04L 47/27*     (2022.01)
*H04L 47/283*    (2022.01)

(52) U.S. Cl.
CPC .............. *H04L 47/25* (2013.01); *H04L 47/27* (2013.01); *H04L 47/283* (2013.01)

(58) Field of Classification Search
CPC ......... H94L 47/25; H04L 47/11; H04L 47/18; H04L 47/19; H04L 47/22; H04L 47/27; H04L 47/28; H04L 47/31; H04L 47/37; H04L 47/00; H04L 43/10; H04L 43/08; H04L 12/56; H04L 12/80; H04L 12/85; H04L 47/25; H04J 1/16; H04J 3/14; H04W 28/02

USPC ........................................................ 370/230
See application file for complete search history.

(56) References Cited

U.S. PATENT DOCUMENTS

| | | | | |
|---|---|---|---|---|
| 7,693,052 | B2* | 4/2010 | Jin | H04L 47/28 370/230 |
| 8,837,279 | B2* | 9/2014 | Nemeth | H04L 47/12 370/230.1 |
| 8,923,115 | B2* | 12/2014 | Pelletier | H04W 28/0205 370/229 |

(Continued)

FOREIGN PATENT DOCUMENTS

KR     20160144257 A     12/2016

OTHER PUBLICATIONS

Gaoxiong Zeng et al., 'Combining ECN and RTT for Datacenter Transport' In Proceedings of APNet' 17, Hong Kong, China, Aug. 4, 2017, pp. 1-7.

(Continued)

*Primary Examiner* — Man U Phan
(74) *Attorney, Agent, or Firm* — Compass IP Law PC

(57) ABSTRACT

Examples described herein relate to a network interface device that is to adjust a transmission rate of packets based on a number of flows contributing to congestion and/or based on whether latency is increasing or decreasing. In some examples, adjusting the transmission rate of packets based on a number of flows contributing to congestion comprises adjust an additive increase (AI) parameter based on the number of flows contributing to congestion. In some examples, latency is based on a measured roundtrip time and a baseline roundtrip time.

17 Claims, 11 Drawing Sheets

(56) References Cited

U.S. PATENT DOCUMENTS

| | | | |
|---|---|---|---|
| 8,923,123 B2* | 12/2014 | Kulkarni | H04L 47/33 370/312 |
| 9,432,297 B2* | 8/2016 | Wu | H04L 43/087 |
| 9,485,184 B2* | 11/2016 | Mehrotra | H04L 47/25 |
| 10,033,653 B2* | 7/2018 | Persson | H04L 47/27 |
| 10,361,963 B2* | 7/2019 | Li | H04L 47/27 |
| 10,492,097 B2* | 11/2019 | Lee | H04L 47/29 |
| 11,115,308 B2* | 9/2021 | Zheng | H04L 47/31 |
| 11,134,018 B2* | 9/2021 | Kameyama | H04L 47/25 |
| 11,509,593 B2* | 11/2022 | Kumar | H04L 47/283 |
| 11,516,139 B2* | 11/2022 | Ismailsheriff | H04L 47/27 |
| 12,074,794 B2* | 8/2024 | Pan | H04L 45/74 |
| 12,212,502 B2* | 1/2025 | Debbage | H04L 1/1621 |
| 2006/0050640 A1 | 3/2006 | Jin et al. | |
| 2009/0073975 A1 | 3/2009 | Shimonishi | |
| 2021/0112002 A1 | 4/2021 | Pan et al. | |
| 2022/0311711 A1* | 9/2022 | Jepsen | H04L 47/27 |

OTHER PUBLICATIONS

International Search Report and Written Opinion for PCT Patent Application No. PCT/US22/48237, Mailed Feb. 1, 2023, 12 pages.

Samba Siva Reddy Maripalli et al., 'Congestion Control for TCP in Data-Center Networks', International Journal of Computer Science and Information Technologies, vol. 5(2), 2014, pp. 1903-1907.

Alizadeh, Mohammad et al., "Data Center TCP (DCTCP)", SIGCOMM, New Delhi, India, 2010, 12 pages.

Bosshart, Pat et al., "P4: Programming Protocol-Independent Packet Processors", ACM SIGCOMM Computer Communication Review, vol. 44, No. 3, Jul. 2014, pp. 88-95.

Brakmo, Lawrence S. et al., "TCP Vegas: New Techniques for Congestion Detection and Avoidance," SIGCOMM, vol. 24, No. 4, 1994, 12 pages.

Gao, Yixiao et al., "DCQCN+: Taming Large-Scale Incast Congestion in RDMA over Ethernet Networks", in 2018 EEE 26th International Conference on Network Protocols (ICNP), Cambridge, United Kingdom, 2018, 11 pages.

InfiniBand Trade Association, "Supplement to InfiniBand™ Architecture Specification vol. 1, Release 1.2.1, Annex A17: RoCEv2", Sep. 2, 2014, 23 pages.

Kumar, Gautam et al., "Swift: Delay is Simple and Effective for Congestion Control in the Datacenter," SIGCOMM 20, New York, NY, USA, 2020, 15 pages.

Li, Yuliang et al., "HPCC: High Precision Congestion Control", SIGCOMM, Beijing, China, 2019, 15 pages.

Mittal, Radhika et al., "TIMELY: RTT-based Congestion Control for the", SIGCOMM, London, UK, 2015, 14 pages.

Montazeri, Behnam et al., "Homa: A Receiver-Driven Low-Latency Transport Protocol Using Network Priorities", SIGCOMM, Budapest, Hungary, 2018, 15 pages.

Musleh, Malek et al., "Fabsim-X: A Simulation Framework for the Analysis of Large-Scale Topologies and Congestion Control Protocols in Data Center Networks", in 28th International Symposium on Modeling, Analysis, and Simulation (MASCOTS), Nice, France, 2020, 8 pages.

The P4.org Applications Working Group, "In-band Network Telemetry (INT) Dataplane Specification, Version 2.1", Nov. 2020, 56 pages.

Zhu, Yibo, "Congestion Control for Large-Scale RDMA Deployments", SIGCOMM, London, UK, 2015, 14 pages.

Extended European Search Report for Patent Application No. 22904876.4, Mailed Oct. 9, 2025, 12 pages.

Zhang Jiao et al.: "Receiver-Driven RDMA Congestion Control by Differentiating Congestion Types in Datacenter Networks", 2021 IEEE 29TH International Conference On Network Protocols (ICNP), IEEE, Nov. 1, 2021 (Nov. 1, 2021), pp. 1-12, XP034061474, Doi: 10.1109/ICNP52444.2021.9651938 [retrieved on Dec. 14, 2021], 12-14 pages.

* cited by examiner

```
1  on_receiving_ACK() {
     // Reference/Target threshold is the midpoint between bRTT and MD_th
2    ref_th = (bRTT + MD_th) /2;
3    LM_th = (1 + Low_margin) * bRTT; // Low Margin threshold
4
5    if (delay >= MD_th)                        // Multiplicative Decrease
6       cwnd = cwnd * bRTT / delay;
7
8    else if (delay < LM_th && last_delay < LM_th) // Low Margin threshold
9       cwnd += Hyper_AI * Low_Margin * BDP;
10
11   else
12      scale = get_scale(cwnd);
13      cwnd -= Ki * alpha * (delay - ref_th) /scale; // PI-integral
14
15      if((last_delay - delay) > MD_th)          // PI-proportional
16         cwnd += Kp * alpha * (MD_th) /scale;
17      else
18         cwnd -= Kp * alpha * (delay - last_delay) /scale;
19   //AI
20   cwnd = (1 - Low_Margin) * cwnd;
21   if ( delay < ref_th && abs(last_delay-delay) < Low_Margin *bRTT)
22      cwnd += BDP * Low_Margin /1.5;    // assume between 1-2 flows
23   else
24      cwnd += BDP * Low_Margin /64;     // estimate number of active flows
25                                        // these parameters are not crucial
26   cwnd = min(BDP, max(cwnd, min_cwnd))  // enforce bounds
27   last_delay = delay
28 }
29 get_scale(){
30   scale = 1;
31   multiplier = 4;
32   while (multiplier * cwnd <= ini_cwnd){
33      scale *= 2;
34      multiplier *= 2;
35   }
36   return scale;
37 }
```

FIG. 2

| |
|---|
| MAC Header |
| IPv4/IPv6 Header |
| UDP Header |
| BTH |
| DestQP set to QPN for which the RoCEv2 CNP is generated |
| Opcode set to b'10000001 |
| PSN set to 0 |
| SE set to 0 |
| M set to 0 |
| P_Key set to the same value as in the BTH of the ECN packet marked |
| (16 bytes) - Reserved, MUST be set to 0 by sender, Ignored by receiver |
| ICRC |
| FCS |

CONGESTION CONTROL

BACKGROUND

Data Center Networks (DCNs) are common platforms for executing heterogeneous types of workloads such as distributed software architectures, Deep Learning, and larger High Performance Computing (HPC). DCN compute, store, and move large amounts of data. Cloud-Service-Providers (CSPs) that operate DCNs are to provide high throughput data computation and low latency of data transfer. However, DCNs can experience congestion arising from network packet traffic. Congestion control (CC) protocols are utilized to control network packet traffic. CC can utilize network congestion information to adjust an injection rate of packets by sender nodes.

BRIEF DESCRIPTION OF THE DRAWINGS

FIG. 2 depicts an example pseudo code.
FIG. 7 depicts an example RoCEv2 CNP packet format.

DETAILED DESCRIPTION

Packet Transmission Adjustment Based on Network Congestion Level

A congestion window can be a number of packets that are transmitted or a total number of bytes or size of packets that have been transmitted. An additive increase (AI or Ai) parameter can increase or decrease the congestion window size per round trip time (RTT). AI can be used to adjust rate of transmission of packets of a flow after a congestion event. For example, using AI, a congestion window size can increase linearly when there is no congestion is detected, but a congestion window size can decrease exponentially based on detection of congestion.

For example, in a network where the base congestion window is 100, if the window has been reduced to 60, with an AI of 1, 40 RTT are needed to ramp up to 100, but fewer RTT with a higher AI value. In a situation where there are 20 flows sending traffic to a same destination at line rate, a congestion window for the senders is 5. If a window of a flow is increased by AI each RTT and if AI is 1, the window will increase from 5 to 6. Accordingly, 20 extra packets can be in the network, until the multiplicative decrease is triggered. However, if AI is 10, a window will grow from 5 to 15, and the aggregated window increases 200 packets every RTT. To properly configure Swift, a worst possible in-cast scenario that may happen in the network is used to compute an appropriate AI.

Some examples consider previous delay measurements for acknowledged packets (e.g., transmitted packets for which receipt acknowledgements (ACK) have been received) to determine a change, if any, to a congestion window size. Examples can adjust the congestion by increasing or decreasing the congestion window based on a determined difference of RTT relative to a baseline RTT.

A rate of CWND adjustment can be based on the current RTT value. Some examples can attempt to stabilize RTT to a target value, cause a fast ramp-up of CWND when congestion is alleviated or not present, or cause fast ramp-down of CWND when congestion is too high. Rather than relying on a constant parameter to adjust CWND, adjustment of CWND can be based on level of congestion as measured by RTT value.

Figure 1:
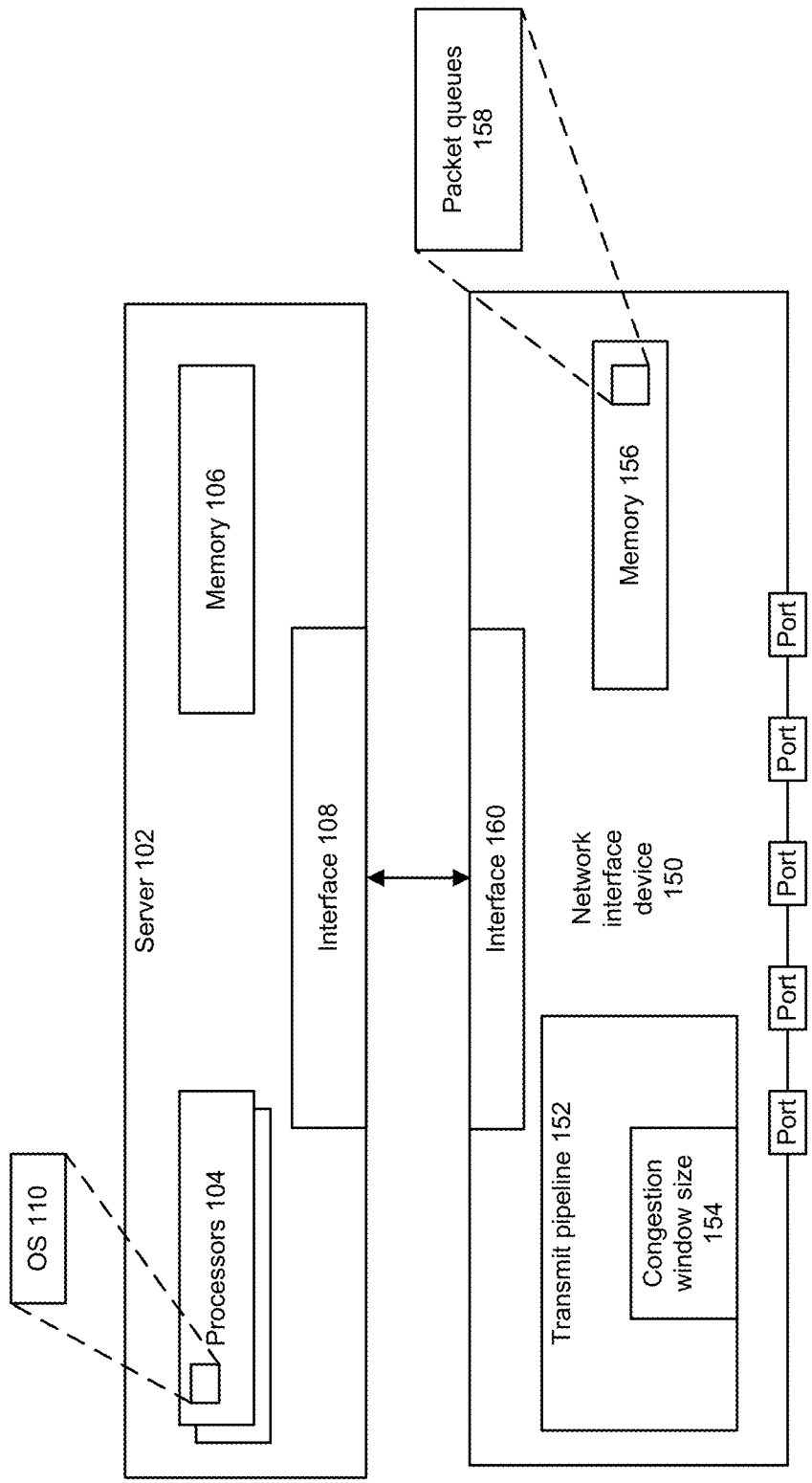
FIG. 1 depicts an example system.

FIG. 1 depicts an example system. Server 102 can include or access one or more processors 104, memory 106, and device interface 108, among other components described herein (e.g., accelerator devices, interconnects, and other circuitry). Processors 104 can execute one or more applications (e.g., microservices, virtual machines (VMs), containers, or other distributed or virtualized execution environments) that request transmission of packets. In some examples, one or more processors 104 can configure network interface device 150 to adjust a congestion window size based on a difference between a measured RTT value and a baseline RTT value or adjust an additive increase parameter based on a number of flows potentially contributing to congestion, as described herein.

Departure times of packets can be determined by software (e.g., an application, hypervisor, device driver, and/or operating system (OS) 110), and/or software executing on network interface device 150 (e.g., data plane software and/or control plane software). The application may command the device driver to send an amount of data, and the device driver can pace out transmission of the data as smaller chunks of data. The application could be running on server 102 or on network interface device 150.

Referring to network interface device 150, transmit pipeline 152 can select a packet for transmission based on transmit time stamp and selection of a packet from one or more of packet queues 158 based on allocated bandwidth from among multiple queues including one or more of: round robin (RR), Deficit Round Robin (DRR), Deficit Weighted Round Robin (DWRR), Prioritized Elastic Round Robin (PERR), weighted fair queuing (WFQ), Strict Priority, or others.

In some examples, transmit pipeline 152 can assign packets from queues 158 stored in memory 156, or packet buffer in memory 106, for transmission. Memory 156 can be implemented as a volatile memory device including a cache (e.g., Level 1 (L1), Level 2 (L2), Level 3 (L3), and/or last level cache (LLC)). Note that while memory 156 is shown as part of network interface device 150, memory 156 can be part of server 102 or another device.

Transmit pipeline 152 can adjust a transmit rate of packets of a flow based on one or more RTT values. Transmit pipeline 152 can adjust the transmit rate of packets of a flow based on whether latency is trending up or down. Transmit pipeline 152 can adjust a transmit rate of packets of a flow by adjusting congestion window (CWND) size 154. In some examples, network interface device 150 can determine a baseline RTT value. An RTT value can be determined based on a time between transmission of a packet and time of receipt for an associated ACK. A baseline RTT can represent a lowest RTT value such as when a network does not transmit packet. An adjustment of CWND, if any, can be based on a different between a measured RTT and the baseline RTT. Example manners of adjusting CWND are described with respect to FIGS. 2 and 3.

As described later, in some examples, congestion window size circuitry 154 can be configured to adjust a congestion window size based on an additive increase (AI) parameter adjusted by a number of flows that potentially contribute to congestion.

Queues 158 can include one or more linked lists that store identifiers or metadata of egress packets ordered based on their transmission timestamps or packets that are not associated with egress time stamps. In some examples, one or more of queues 158 can be associated with a priority-based selection or non-timestamp-based scheme.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be discriminated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Network interface device 150 can be implemented as one or more of: a network interface controller (NIC), a remote direct memory access (RDMA)-enabled NIC, SmartNIC, router, switch, forwarding element, infrastructure processing unit (IPU), data processing unit (DPU), or network-attached appliance (e.g., storage, memory, accelerator, processors, security), and so forth.

FIG. 2 depicts an example pseudo code. A transmit scheduler can calculate a congestion window for flows going through a congested link. The pseudo code can compute the CWND in bytes. In the pseudocode, example descriptions of parameters are as follows.

| Parameter | Example description |
| --- | --- |
| MD_th | Multiplicative decrease threshold. |
| Low_Margin | A percentage to compute the low margin threshold and to calculate the additive increase. |
| bRTT | Base RTT of the network. |
| Alpha | Default value can be 1.28 B/ns |
| Hyper_AI | Hyper additive increase factor to boost the cwnd. By default, it can be set to 4. |
| Kp | Coefficient for the proportional term. By default, it can be set to 10. |
| Ki | Coefficient for the integral term. The default value can be set to 1. |

Lines 5-6 represent an example manner to determine multiplicative decrease. The CWND is multiplied by the proportion of the measure delay with respect the base RTT. Lines 8-9 describe the low margin threshold behavior where the CWND is increased by low margin times bandwidth delay product (BDP).

Lines 12-18 show an example operation that scales the adjustment parameter (lines 29-37) from where the CWND is with respect the initial CWND. In other words, the smaller the CWND is, the more the CWND can be adjusted. Lines 20-26 illustrate an example of how additive increase is computed.

Figure 3:
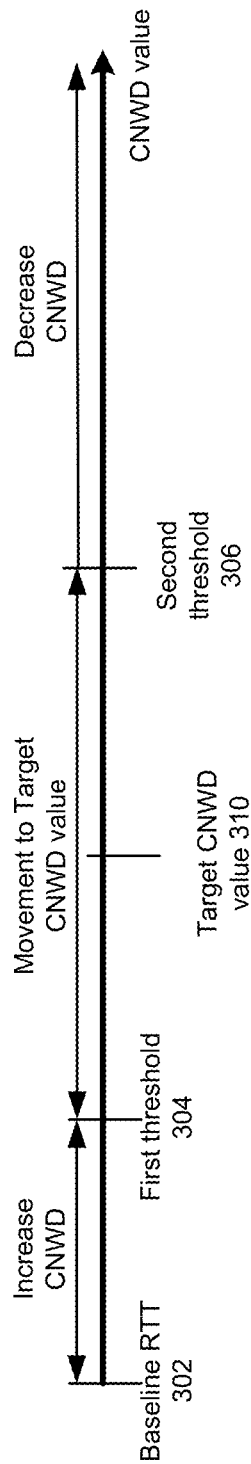
FIG. 3 depicts an example of adjustment to CWND based on the measured network delay.

FIG. 3 depicts an example of adjustment to CWND based on the measured network delay. For example, if a difference between measured RTT and the baseline RTT 302 is less than or equal to first threshold 304, then the CWND can be increased but not beyond first threshold 304. First threshold 304 can be higher (e.g., 5-20%) than baseline RTT 302. First threshold 304 can represent a level of no or acceptable congestion. In some examples, N or more consecutive delay measurements lower than first threshold 304 can trigger a hyper additive increase to increase CWND. A hyper additive increase can be 20% or more, but CWND is not to exceed a maximum CWND. Other examples of increase can be used.

For example, if a difference between measured RTT and the baseline RTT 302 is more than first threshold 304 but less than or equal to second threshold 306, then the CWND can be adjusted to be target CWND value 310.

For example, if a difference between measured RTT and the baseline RTT 302 is more than second threshold 306, then the CWND can be decreased. A decrease of CWND can be by a Multiplicative Decrease (MD). Second threshold 306 can represent a level of congestion of a path that is too high. In some examples, a single delay measure higher than second threshold 306 can trigger, which can reduce the CWND proportionally to the measured RTT. In other words, the higher the value of measured RTT, the higher the reduction in CWND.

Figure 4:
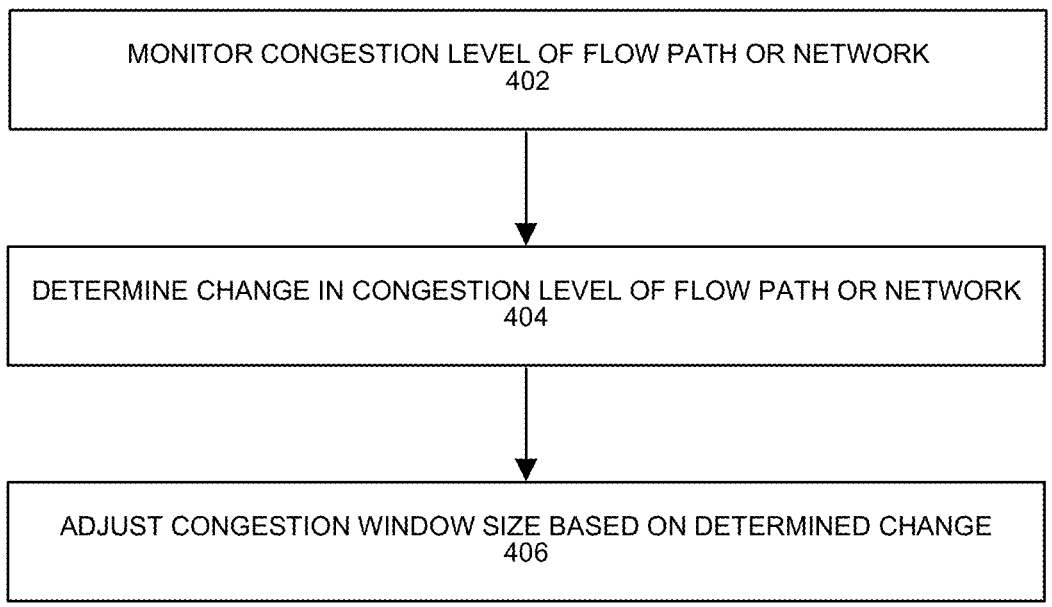
FIG. 4 depicts an example process.

FIG. 4 depicts an example process. The process can be performed by a network interface device. At 402, congestion of a path of a flow can be monitored. For example, monitoring congestion can take place by determining an RTT based on a difference between transmit time of a packet and time of receipt of an ACK associated with the packet. At 404, a difference or change in congestion in a path or network can be determined. For example, the difference or change in congestion can be determined based on change between the RTT relative to an baseline RTT. The baseline RTT can represent an RTT value associated with low or no congestion in a path of a flow or the network, in general.

At 406, a congestion window can be adjusted based on the determined difference or change in congestion. For example, based on the determined difference being less than a first threshold, the congestion window can be increased by a highest level. Based on the determined difference being within a range, the congestion window can be adjusted to be a target congestion window value. Based on the determined difference being more than a second threshold, the congestion window can be reduced by a level. In some examples, a level of increase or decrease of a congestion window size can be amplified for successive determined differences that are less than the first threshold or more than the second threshold. In some examples, a transmit rate of packets of a flow can be increased based on latency trending downwards (lessening) or a transmit rate of packets of a flow can be decreased based on latency trending upwards (increasing). Contributor-Based Adjustment of Packet Injection Congestion Notification Packets (CNPs), Explicit Congestion Notification (ECN) and Priority-Flow-Control (PFCs) can be used to reduce a rate of packet injection into a network and potentially reduce network congestion. CNPs can notify senders to reduce packet injection rate. Schemes to recover or increase injection rate are utilized after congestion is alleviated. In order to perform injection rate increase, schemes such as Data Center Quantized Congestion Notification (DCQCN) or high precision congestion control (HPCC) increase the injection rate by some amount several times until they reach a congestion level on the network. An amount of injection increase can be additive increase and the amount used to increase the rate is usually an Additive Increase parameter (AI or Ai).

The Additive Increase parameter can be a static value. Choosing a value for Additive Increase can depend on traffic patterns. If the value chosen is too small for a particular traffic pattern, the rate recovery phase of the flows can be too slow resulting in inefficient use of available bandwidth and slow convergence to fairness. Conversely, if the value chosen is too large for a particular traffic pattern, the rate recovery can be too aggressive resulting unnecessary buffering in the fabric resulting in increased latencies (and PFCs in the case of DCQCN). In both cases, deviation from the ideal rate can slow or even prevent convergence to fair bandwidth usage.

The difficulty in properly configuring the Additive Increase parameter is compounded when considering other flows in the network colliding at the same congestion point. At a point where N flows collide, the total aggregate rate increase that the congestion point will experience would be N×Ai. The number of flows colliding in a congestion point is not something known beforehand and is something that changes during time based on the network traffic.

Some examples include a receiver network interface device that utilizes a congested queue detecting a number of active flows and sending the number of active flows as a parameter to sender network interface devices. An active flow can be a flow that sends packets to the congested queue at a regular pace, among other examples. One or more sender network interface device can dynamically adjust the Additive Increase parameter, Ai, based on the number of active flows that are providing packets to the congested queue. Accordingly, some examples provide for control of aggregate transmit rate increase by sender network interface device that depends on the number of flows that are contributing to the congestion and can reduce packet transmission latencies.

Figure 5:
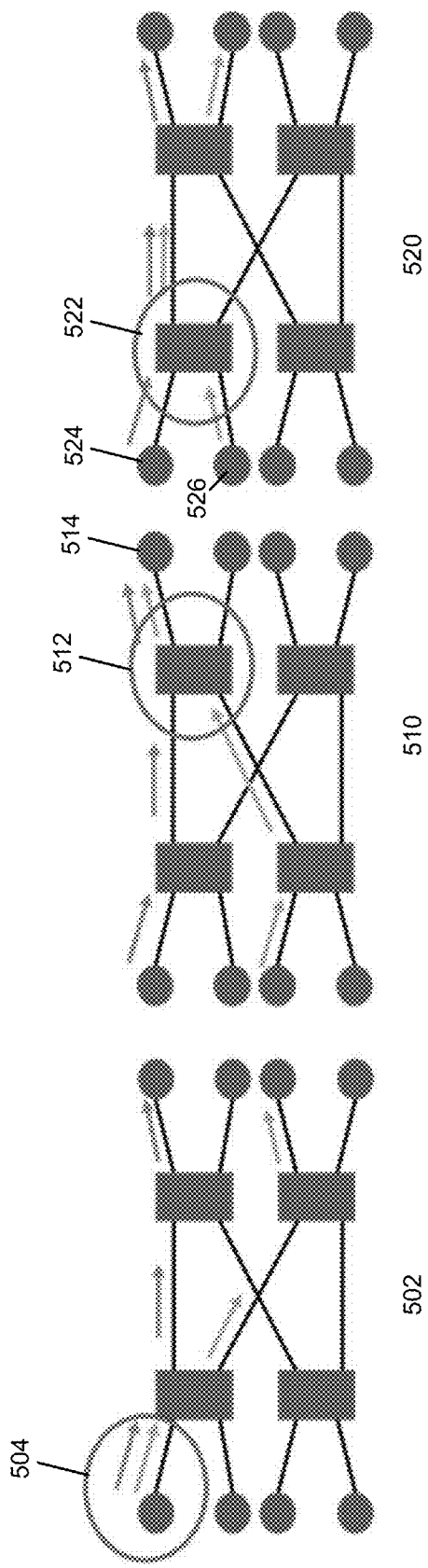
FIG. 5 depicts an example of potential congestion scenarios.

FIG. 5 depicts an example of potential congestion scenarios. At 502, congestion occurs at a sender node 504 (circled node). Sender node 502 directs packets of multiple flows to different destination nodes, which compete for the same output port or queue, which leads to congestion at the port or queue.

At 510, congestion occurs at a last receiver switch node 512 (circled node) prior to an endpoint receiver. Receiver switch node 512 is connected to endpoint receiver node 514. In this example, packets of multiple flows destined to endpoint receiver node 514 compete for use of the same output port or queue, which leads to congestion at the port or queue. As described herein, receiver switch node 512 can identify two sources of packet flows. Receiver switch node 512 can calculate an Ai value and indicate that two sources of packet flows contribute to congestion.

At 520, congestion occurs in switch 522, which is in a network before a last switch. In this example, packets of multiple flows destined to multiple endpoint receiver nodes compete for use of the same output port or queue, which leads to congestion at the port or queue. As described herein, receiver switch node 522 can identify two sources of packet flows. Receiver switch node 522 can calculate an Ai value and indicate to endpoint senders 524 and 526 that two sources of packet flows contribute to congestion.

Figure 6:
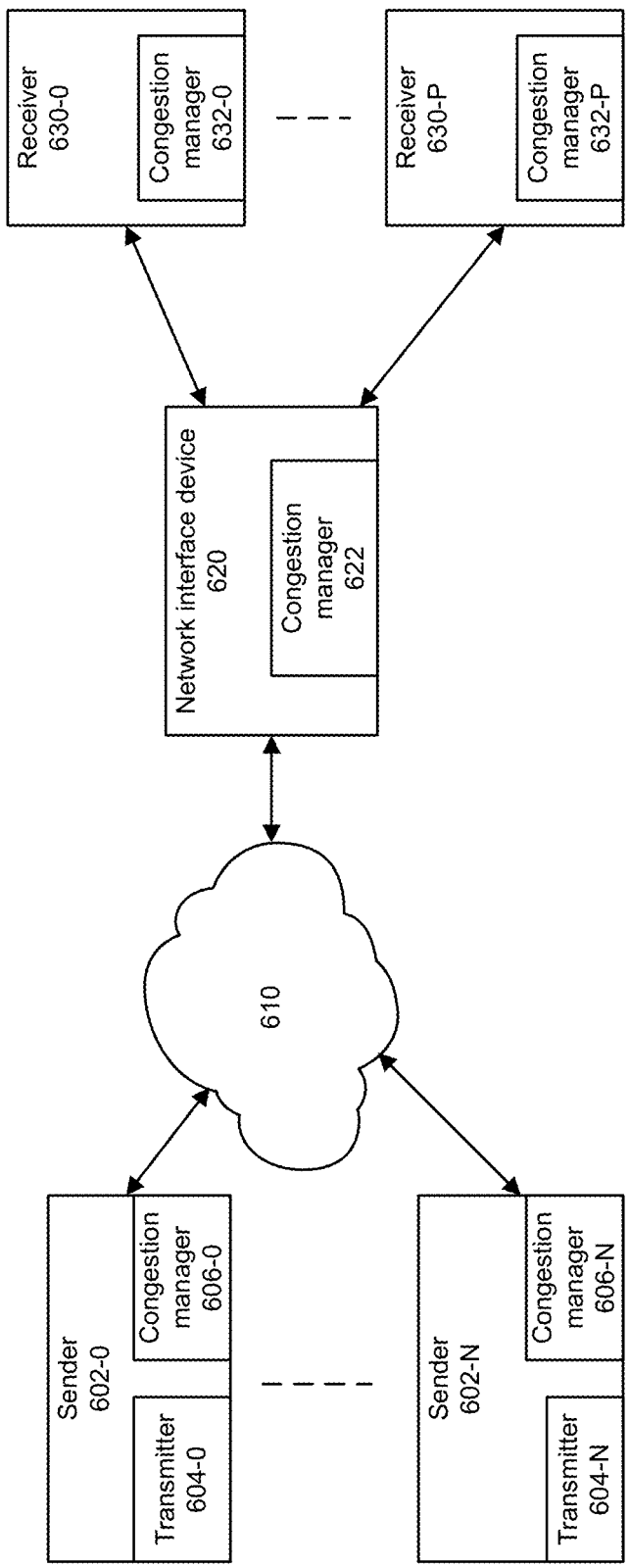
FIG. 6 depicts an example system.

FIG. 6 depicts an example system. Sender nodes 602-0 to 602-N can transmit packets associated with one or more flows using respective transmitters 604-0 to 604-N, where N≥1. Example implementations of sender nodes 602-0 to 602-N are described herein at least with respect to FIGS. 1, 9A, and 9B, among other places.

Transmitters 604-0 to 604-N can send packets associated with one or more flows to one or more of receivers 630-0 to 630-P, where P≥1, through network 610 and network interface device 620. In a manner described herein, determination of an Ai and number of active flows that contribute or cause congestion at a port or queue can be performed by one or more of congestion managers 606-0 to 606-N of respective senders 602-0 to 602-N, congestion manager 622 of network interface device 620, and/or congestion managers 632-0 to 632-P of respective receivers 630-0 to 630-P.

For example, a congestion manager can identify congestion by a queue filling at or beyond a level of bytes or packets associated with congestion. In some examples, one or more congestion managers can determine a number of active flows and cause the determined number of active flows to be sent to one or more of sender nodes 602-0 to 602-N. An example manner to determine a number of active flows is described later. Congestion managers of one or more of sender nodes 602-0 to 602-N can calculate an adjusted AI value based on the number of active flows. An AI value can be a congestion window size. An example determination of an Ai value is described at least in the Swift publication. For example, one or more of congestion managers 606-0 to 606-N can determine an Ai value for a flow as Ai value/M, where M represents a number of active flows in the congested device. Transmitters 604-0 to 604-N can adjust a transmission rate of packets for a flow based on the adjusted Ai value. One or more of congestion managers 606-0 to 606-N can store Ai information per active of inactive flow transmitted from respective sender nodes 602-0 to 602-N. One or more of congestion managers 606-0 to 606-N can re-calculate Ai for a changed number of active flows identified by a device experiencing congestion. One or more of congestion managers 606-0 to 606-N can adjust the congestion window size based on its re-calculated Ai value.

Using an Ai value adjusted relative to a number of active flows provides adaptivity to support different congestion levels without resetting parameters when workload behavior changes and can improve network stability and reduce tail latency. Fairness can be applied per sender node instead of per flow because measurements are performed in the sender. For example, two senders (A and B) send packets to endpoint C, where sender A sends packets of two active flows to endpoint C, but sender B sends packets of one flow to endpoint C. In that case, in the recovery phase, active flows are counted and sender A can increase each flow by Ai/2 (A has 2 flows) and B can increase its flow by Ai (B has one flow). So, sender A and sender B separately increase their total rates by Ai. When the congestion point disappears and less active flows are detected, increasing the value of Ai can lead to a faster recovery or increase of injection rate.

Various examples of determining a number of active flows are described next. A number of active flows can be measured at multiple devices such as one or more of sender nodes 602-0 to 602-N, network interface device 620, and/or receivers 630-0 to 630-P and a higher number of active flows can be used as variable M. At sender nodes 602-0 to 602-N, packets of flows compete for the same output port or queue in the network interface device. In this case, network interface devices can utilize a counter of how many transmit queues or remote direct memory access (RDMA) queue pairs (QPs) are active.

In receivers 630-0 to 630-P, a count of a number of active flows could utilize a counter of how many receive queues or remote direct memory access (RDMA) queue pairs (QPs) are active. After the number is calculated, the number of active flows (M) can be sent by a notification packet (e.g., RDMA over Converged Ethernet (RoCE) congestion notification packet (CNP)), so the sender node can use that information to increase the rate proportionally for a given flow by Ai/M.

In network interface device 620, congestion manager 622 (e.g., a programmable packet processing pipeline) can calculate a number of active flows (M) and include that information in a packet sent to one or more sender nodes 602-0 to 602-N. In some examples, a receiver node can compare M with its calculated number of active flows (e.g., using a counter of active transmit/receive queues or active QP) and can send the higher number of M by a notification packet (e.g., CNP).

An active flow could be a flow that had some activity (sent or received packets) within a time window from the current time. For example, hardware resources can perform a count of active flows/queues and use timers to determine if a flow did not send/receive data in a time period and is considered not active. In some examples, upper or lower bounds can be used when performing a count of active flows. The value of Ai can have granularity with a lower bound, in that there is a point where measuring more flows is not going to reduce the Ai value lower to that lower bound. Therefore, counting more than that number of flows is not needed and an upper bound to flow count can be applied. In some examples, a Bloom filter can be used to approximate a number of active flows. For example, a Bloom filter can be used to count a number of active flows in a period of time (T) where the flow can be an element and a counter increases based on the filter identifying a new element. The counter and the filter could be reset after time T.

Determination of active number of flows can be performed in a firmware executed by a network interface device, a programmable or fixed function pipeline of a network interface device, and/or operating system (OS) kernel.

Referring again to FIG. 1, in some examples, congestion window size circuitry 154 can be configured to adjust a congestion window size based on an indication of congestion and number of flows that potentially contribute to congestion.

FIG. 7 depicts an example RoCEv2 CNP packet format. In some examples, Packet Sequence Number (PSN) field (e.g., 24 bits) or the reserved 16 bytes can be used to send a value representing a number of active flows in the congested device and/or Ai. In other examples, the value representing a number of active flows in the congested device and/or Ai can be sent using technologies described with respect to In-band Network-Telemetry (INT) (see, e.g., "In-band Network Telemetry (INT) Dataplane Specification," Version 2.1 (2020), as well as earlier versions, later versions, or revisions thereof.)

Figure 8A:
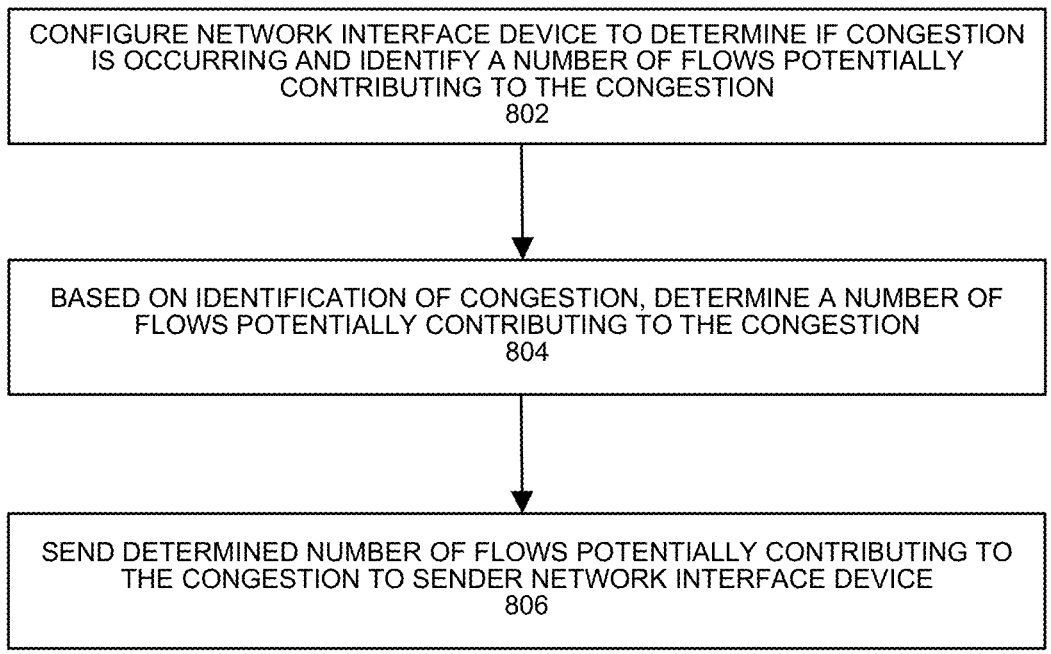
FIG. 8A depicts an example process.

FIG. 8A depicts an example process. The process can be performed by a sender network interface device, intermediate switch, and/or receiver network interface device. At 802, a network interface device can be configured to determine whether congestion is occurring and a number of active flows potentially contributing to the congestion. For example, congestion can be identified to occur at a port or queue. A driver and/or orchestrator can configure the network interface device to determine whether congestion is occurring and a number of active flows potentially contributing to the congestion. Congestion can be identified to occur based on a fill level of a queue meeting or exceeding a congestion threshold level in terms of size of packets (e.g., in bytes) or number of packets.

At 804, based on the congestion being identified, the network interface device can determine the number of active flows potentially contributing to the congestion. For example, the number of active flows potentially contributing to the congestion can be determined based on a count of how many transmit or receive queues or remote direct memory access (RDMA) queue pairs (QPs) are active. In some examples, a count or estimate of flows with associated packets received at the network interface device received less than a time threshold amount from a current time can be determined.

At 806, the network interface device can send the determined number of active flows potentially contributing to the congestion to one or more sender network interface devices.

Figure 8B:
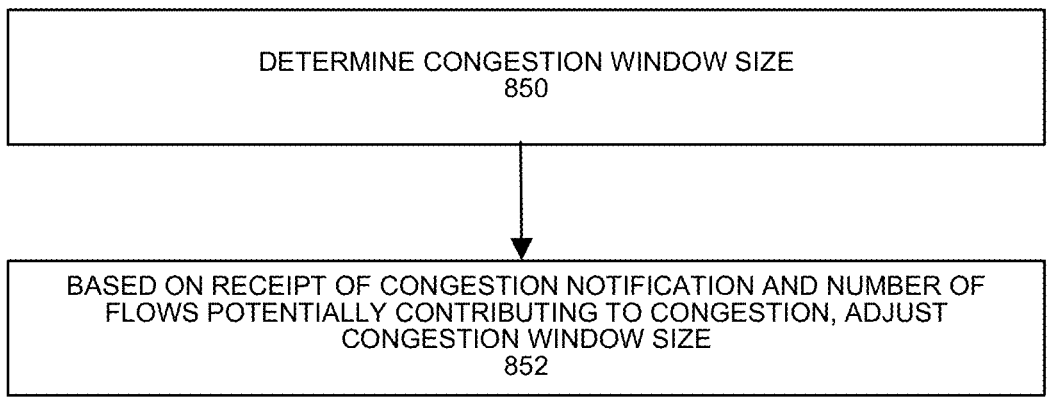
FIG. 8B depicts an example process.

FIG. 8B depicts an example process. At 850, a network interface device can determine a congestion window size for transmitted packets. At 852, based on receipt of an indication of congestion and a determined number of active flows potentially contributing to the congestion, the network interface device can adjust the congestion window size by an additive increment (AI) over an RTT amount divided by the determined number of active flows potentially contributing to the congestion.

Figure 9A:
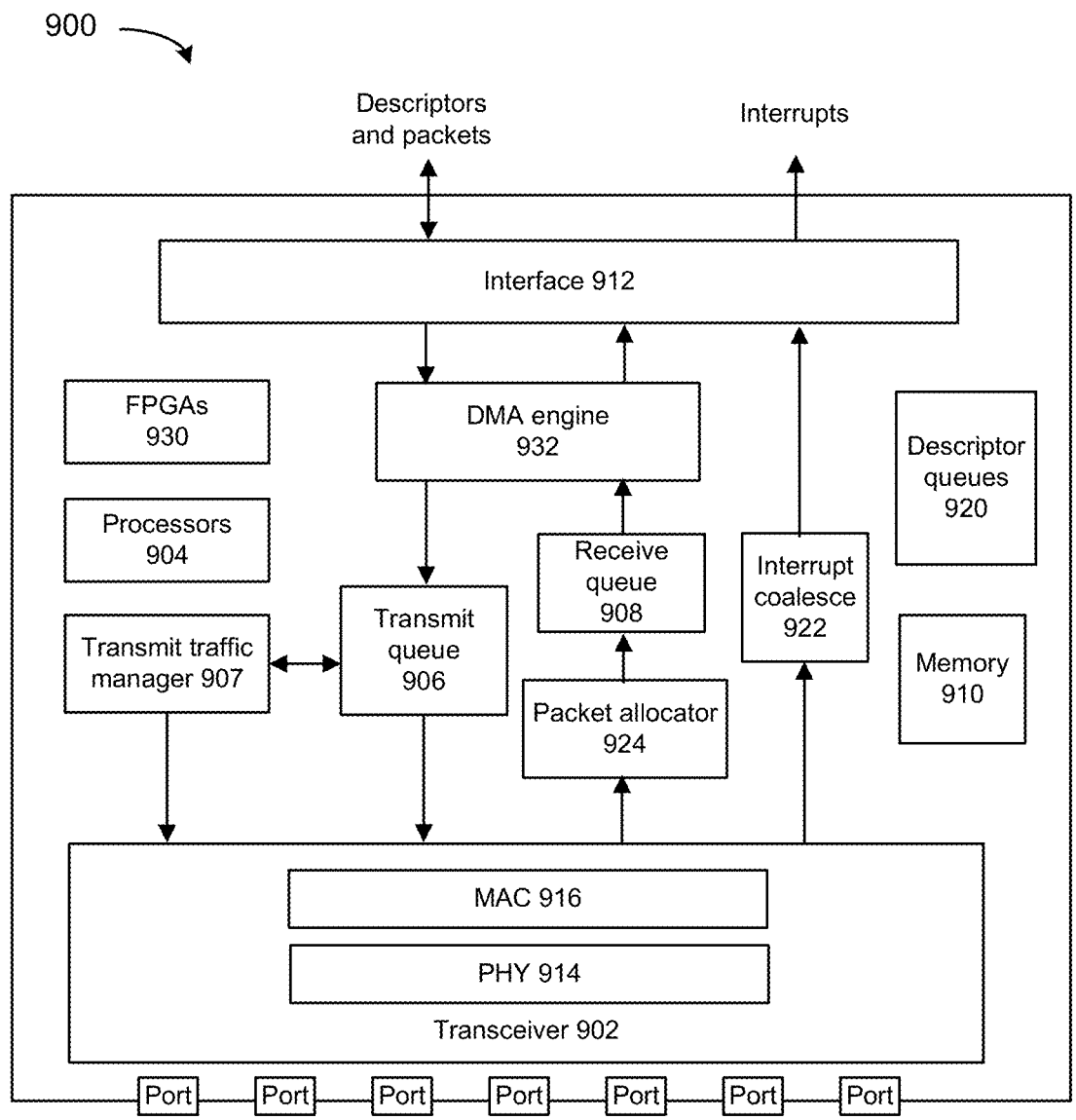
FIG. 9A depicts an example network interface device.

FIG. 9A depicts an example network interface device. Various processor resources in the network interface can adjust a congestion window size based on measured network congestion and/or number of flows contributing to congestion, as described herein. In some examples, network interface 900 can be implemented as a network interface controller, network interface card, a host fabric interface (HFI), or host bus adapter (HBA), and such examples can be interchangeable. Network interface 900 can be coupled to one or more servers using a bus, PCIe, CXL, or DDR. Network interface 900 may be embodied as part of a system-on-a-chip (SoC) that includes one or more processors, or included on a multichip package that also contains one or more processors.

Some examples of network device 900 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 900 can include transceiver 902, processors 904, transmit queue 906, receive queue 908, memory 910, and bus interface 912, and DMA engine 932. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include PHY circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to perform MAC address filtering on received packets, process MAC headers of received packets by verifying data integrity, remove preambles and padding, and provide packet content for processing by higher layers. MAC circuitry 916 can be configured to assemble data to be transmitted into packets, that include destination and source addresses along with network control information and error detection hash values.

Processors 904 can be any a combination of a: processor, core, graphics processing unit (GPU), field programmable gate array (FPGA), application specific integrated circuit (ASIC), or other programmable hardware device that allow programming of network interface 900. For example, a "smart network interface" or SmartNIC can provide packet processing capabilities in the network interface using processors 904.

Processors 904 can include a programmable processing pipeline that is programmable by Programming Protocol-independent Packet Processors (P4), C, Python, Broadcom Network Programming Language (NPL), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content. Processors 904 can determine a number of active flows that contribute to congested queue or port for use in determining the number of active flows in the congested device and adjust a congestion window size based on measured network congestion and/or number of flows contributing to congestion, as described herein.

Transmit traffic manager 907 can select a packet to allocate to a transmit time slot from among queues. Transmit traffic manager 907 can set and utilize a congestion window size based on examples described herein. Transmit traffic manager 907 can be implemented as part of processors 904 and/or FPGAs 930.

Packet allocator 924 can provide distribution of received packets for processing by multiple CPUs or cores using receive side scaling (RSS). When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 932 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with or based at least in part on PCI, PCI Express, PCI-x, Serial ATA, and/or USB (although other interconnection standards may be used), or proprietary variations thereof.

Figure 9B:
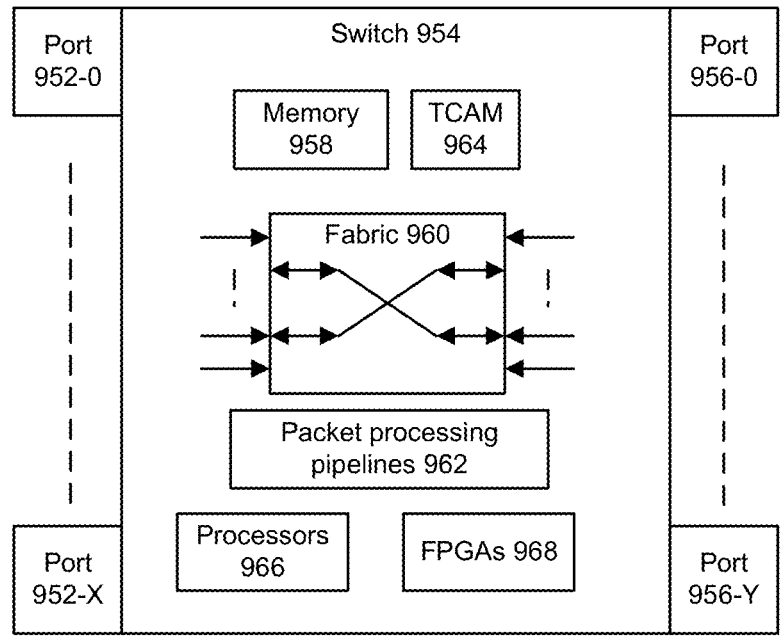
FIG. 9B depicts an example switch.

FIG. 9B depicts an example switch. Various embodiments can be used in or with the switch to determine a number of active flows that contribute to congested queue or port for use in determining the number of active flows in the congested device and adjust a congestion window size based on measured network congestion and/or number of flows contributing to congestion, as described herein. Switch 954 can route packets or frames of any format or in accordance with any specification from any port 952-0 to 952-X to any of ports 956-0 to 956-Y (or vice versa). Any of ports 952-0 to 952-X can be connected to a network of one or more interconnected devices. Similarly, any of ports 956-0 to 956-Y can be connected to a network of one or more interconnected devices.

In some examples, switch fabric 960 can provide routing of packets from one or more ingress ports for processing prior to egress from switch 954. Switch fabric 960 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 958 can be configured to store packets received at ports prior to egress from one or more ports. Packet processing pipelines 962 can determine which port to transfer packets or frames to using a table that maps packet characteristics with an associated output port. Packet processing pipelines 962 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 962 can implement access control list (ACL) or packet drops due to queue overflow. Packet processing pipelines 962 can be configured to determine a number of active flows that contribute to congested queue or port for use in determining the number of active flows in the congested device and adjust a congestion window size based on measured network congestion and/or number of flows contributing to congestion, as described herein.

Configuration of operation of packet processing pipelines 962, including its data plane, can be programmed using example programming languages and manners described herein. Processors 966 and FPGAs 968 can be utilized for packet processing or modification.

Figure 10:
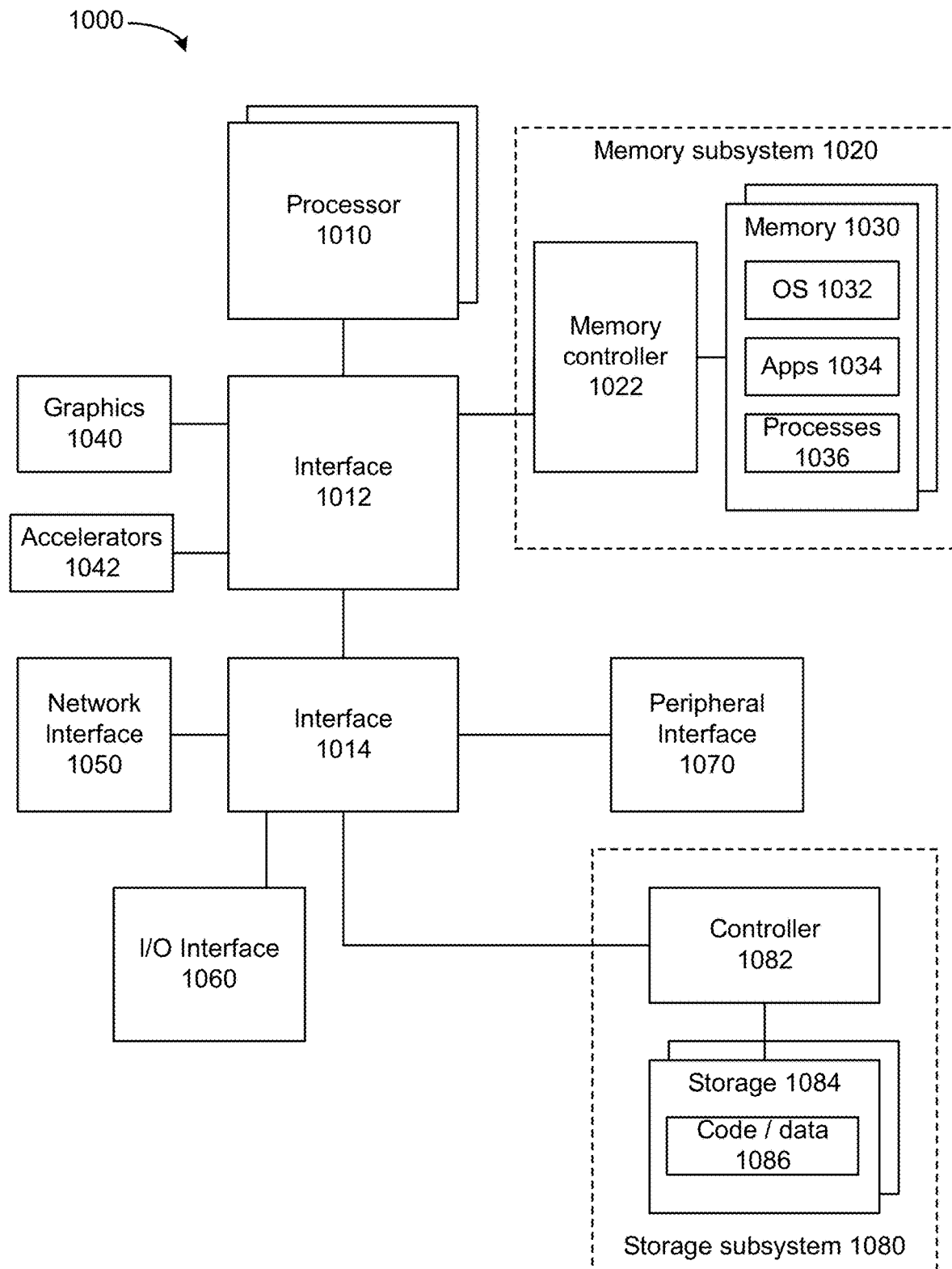
FIG. 10 depicts an example computing system.

FIG. 10 depicts an example computing system. Components of system 1000 (e.g., processor 1010, network interface 1050, and so forth) to determine a number of active flows that contribute to a congested queue or port for use in determining the number of active flows in the congested device and adjust a congestion window size based on measured network congestion and/or number of flows contributing to congestion, as described herein. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function or programmable offload engine that can be accessed or used by a processor 1010. For example, an accelerator among accelerators 1042 can provide compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, OS 1032 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 1050 to determine a number of active flows that contribute to congested queue or port for use in determining the number of active flows in the congested device and adjust a congestion window size based on measured network congestion and/or number of flows contributing to congestion, as described herein. In some examples, a driver can enable or disable offload to network interface 1050 of determining a number of active flows that contribute to congested queue or port for use in determining the number of active flows in the congested device and adjusting a congestion window size based on measured network congestion and/or number of flows contributing to congestion, as described herein. A driver can advertise to OS 1032 and/or one or more applications, capability of network interface 1050 to perform one or more aspects of network interface 1050 to determine a number of active flows that contribute to congested queue or port for use in determining the number of active flows in the congested device and adjust a congestion window size based on measured network congestion and/or number of flows contributing to congestion, as described herein.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory.

Some examples of network interface 1050 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, system-on-chip (SoC), and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example includes a network interface device that includes circuitry to select a packet for transmission based on a departure time that ignores a pause command. In some examples, the pause command is a pause packet. In some examples, the pause command is a Priority Flow Control (PFC) packet.

Example 1 includes one or more examples, and includes an apparatus comprising: a network interface device comprising circuitry to adjust a transmission rate of packets based on a number of flows contributing to congestion.

Example 2 includes one or more examples, wherein the number of flows contributing to congestion is received in a packet header field from a network interface device that detected the congestion.

Example 3 includes one or more examples, wherein the adjust the transmission rate based on the number of flows contributing to congestion comprises adjust an additive increase (AI) parameter based on the number of flows contributing to congestion.

Example 4 includes one or more examples, wherein the adjust the transmission rate based on the number of flows contributing to congestion comprises adjust a congestion window size based on the AI parameter divided by the number of flows contributing to congestion.

Example 5 includes one or more examples, wherein the circuitry is to adjust a congestion window size based on a difference between round trip time (RTT) and a baseline RTT.

Example 6 includes one or more examples, wherein the RTT is based on a difference between packet transmit time and time of received acknowledgement (ACK).

Example 7 includes one or more examples, wherein the adjust the congestion window size comprises increase the congestion window size based on a first threshold.

Example 8 includes one or more examples, wherein the adjust the congestion window size comprises set the congestion window to a congestion window value based on the difference being more than a first threshold and less than a second threshold.

Example 9 includes one or more examples, wherein the adjust the congestion window size comprises decrease the congestion window size based on a second threshold.

Example 10 includes one or more examples, wherein the circuitry comprises a programmable packet processing pipeline.

Example 11 includes one or more examples, comprising a server comprising at least one processor to execute a driver to configure the circuitry to adjust a packet transmission rate based on a number of flows contributing to congestion.

Example 12 includes one or more examples, comprising a datacenter comprising the server and a second server, wherein the second server is to received transmitted packets from the network interface device.

Example 13 includes one or more examples, and includes an apparatus comprising: a network interface device comprising circuitry to adjust a transmit rate of packets of a flow based on whether latency is increasing or decreasing.

Example 14 includes one or more examples, wherein the latency is based on a measured roundtrip time and a baseline roundtrip time.

Example 15 includes one or more examples, wherein the baseline roundtrip time comprises a roundtrip time of an uncongested network.

Example 16 includes one or more examples, and includes a computer-readable medium comprising instructions stored thereon, which when executed by one or more processors, cause the one or more processors to: configure a network interface device to adjust a transmission rate of packets based on a number of flows contributing to congestion and/or based on whether latency is increasing or decreasing.

Example 17 includes one or more examples, wherein the adjust the transmission rate of packets based on a number of flows contributing to congestion comprises adjust an additive increase (AI) parameter based on the number of flows contributing to congestion.

Example 18 includes one or more examples, wherein the adjust the transmission rate based on the number of flows contributing to congestion comprises adjust a congestion window size based on the AI parameter divided by the number of flows contributing to congestion.

Example 19 includes one or more examples, comprising instructions stored thereon, which when executed by one or more processors, cause the one or more processors to: configure the network interface device to adjust a congestion window size based on a determined difference of round trip time (RTT) relative to a baseline RTT.

Example 20 includes one or more examples, wherein the latency is based on a measured roundtrip time and a baseline roundtrip time.

What is claimed is:

1. An apparatus comprising:
a network interface device comprising:
circuitry to adjust a transmission rate of packets based on a number of multiple flows contributing to congestion;
a direct memory access (DMA) circuitry;
a host interface; and
a network interface, wherein the adjust the transmission rate based on the number of flows contributing to congestion comprises adjust an additive increase parameter based on the number of multiple flows contributing to congestion and wherein the adjust the transmission rate based on the number of multiple flows contributing to congestion comprises adjust a congestion window size based on the additive increase parameter and the number of multiple flows contributing to congestion.

2. The apparatus of claim 1, wherein the number of multiple flows contributing to congestion is received in a packet header field from a network interface device that detected the congestion.

3. The apparatus of claim 1, wherein the circuitry is to adjust a congestion window size based on a difference between round trip time (RTT) and a baseline RTT.

4. The apparatus of claim 3, wherein the RTT is based on a difference between packet transmit time and time of received acknowledgement (ACK).

5. The apparatus of claim 3, wherein the adjust the congestion window size comprises increase the congestion window size based on a first threshold.

6. The apparatus of claim 3, wherein the adjust the congestion window size comprises set the congestion window to a congestion window value based on the difference being more than a first threshold and less than a second threshold.

7. The apparatus of claim 3, wherein the adjust the congestion window size comprises decrease the congestion window size based on a second threshold.

8. The apparatus of claim 1, wherein the circuitry comprises a programmable packet processing pipeline that comprises one or more match-action units (MAUs).

9. The apparatus of claim 1, comprising a server comprising at least one processor to execute a driver to configure the circuitry to adjust a packet transmission rate based on the number of multiple flows contributing to congestion.

10. The apparatus of claim 9, comprising a datacenter comprising the server and a second server, wherein the second server is to received transmitted packets from the network interface device.

11. An apparatus comprising:
a network interface device comprising:
a direct memory access (DMA) circuitry;
a host interface;
a network interface; and
circuitry to adjust a transmit rate of packets of a flow based on whether latency is increasing or decreasing, a number of multiple flows contributing to congestion, wherein the adjust the transmit rate of packets of the flow comprises adjust a congestion window size based on an additive increase (AI) parameter and the number of multiple flows contributing to congestion.

12. The apparatus of claim 11, wherein the latency is based on a measured roundtrip time and a baseline roundtrip time.

13. At least one non-transitory computer-readable medium comprising instructions stored thereon, which when executed by one or more processors, cause the one or more processors to:
configure a network interface device to adjust a transmission rate of packets based on a number of multiple flows contributing to congestion and/or based on whether latency is increasing or decreasing, wherein:
the network interface device comprises a direct memory access (DMA) circuitry; a host interface; and a network interface, and
the adjust the transmission rate of packets based on the number of multiple flows contributing to congestion comprises adjust a congestion window size based on an additive increase (AI) parameter and based on the number of multiple flows contributing to congestion.

14. The computer-readable medium of claim 13, comprising instructions stored thereon, which when executed by one or more processors, cause the one or more processors to:
configure the network interface device to adjust a congestion window size based on a determined difference of round trip time (RTT) relative to a baseline RTT.

15. The computer-readable medium of claim 13, wherein the latency is based on a measured roundtrip time and a baseline roundtrip time.

16. The apparatus of claim 1, wherein the additive increase parameter is consistent with High Precision Congestion Control (HPCC).

17. The apparatus of claim 12, wherein:
the baseline roundtrip time comprises a roundtrip time of an uncongested network and
the circuitry to adjust the transmit rate of packets of the flow based on whether latency is increasing or decreasing by adjusting the congestion window size towards a target congestion window value.

* * * * *